Nov. 6, 1962 T. M. LAAKSO ET AL 3,062,785
CONDENSATION PRODUCTS OF C-VINYLPYRIDINIUM HALOKETONE
POLYMERS WITH HYDRAZIDES CONTAINING QUATERNARY
NITROGEN GROUPS
Original Filed Sept. 3, 1957
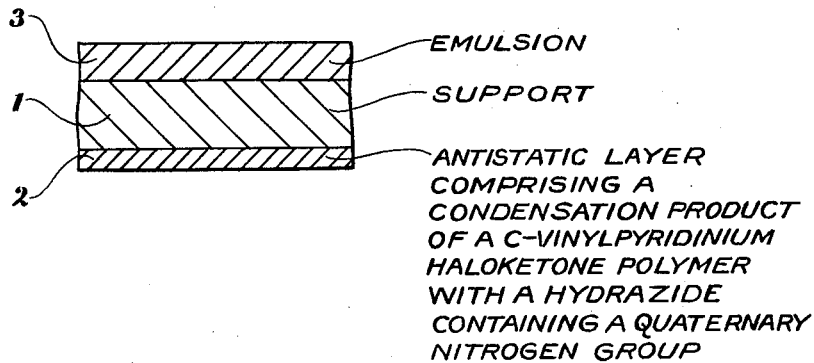
Thomas M. Laakso
Jack L. R. Williams
INVENTORS
BY R. Frank Smith
Leonard E. Branchen
ATTORNEY & AGENT 3,062,785
CONDENSATION PRODUCTS OF C-VINYLPYRI-
DINIUM HALOKETONE POLYMERS WITH HY-
DRAZIDES CONTAINING QUATERNARY NITRO-
GEN GROUPS
Thomas M. Laakso and Jack L. R. Williams, Rochester,
N.Y., assignors to Eastman Kodak Company, Roches-
ter, N.Y., a corporation of New Jersey
Original application Sept. 3, 1957, Ser. No. 681,604. Di-
vided and this application Dec. 23, 1960, Ser. No.
78,053
5 Claims. (Cl. 260—65)

This invention relates to condensation products of cer-
tain quaternary salts of C-vinylpyridine polymers with
certain substituted hydrazine salts, and more particularly
to quaternary salts obtained by reacting poly-C-vinylpy-
ridinium haloketones with, for example, Girard reagents
"T" and "P" (betainehydrazide hydrochloride and carbo-
hydrazinomethylpyridinium chloride, respectively), to ma-
terials prepared therewith, and to process for preparing
such polymeric salts and materials.

This is a division of our copending application Serial
No. 681,604, filed September 3, 1957, now Patent No.
2,972,538.

The new class of resinous polymers of the invention
consist of from 70 to approximately 100 percent by weight
in linear combination of a recurring structural unit se-
lected from those represented by the following general
structures:

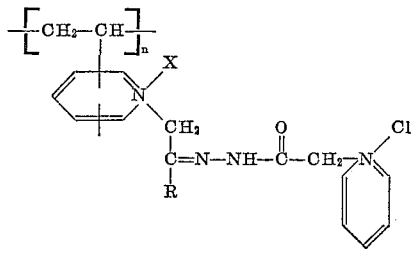

and

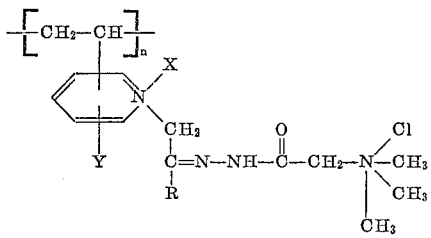

the remainder of the polymer molecule being residual
C-vinylpyridinium haloketone units represented by the
following general structure:

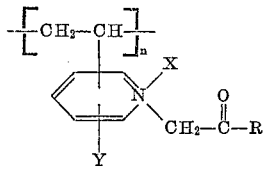

wherein in each instance $n$ represents a whole number and
indicates that the group recurs, Y represents an atom
of hydrogen or an alkyl group of 1 to 4 carbon atoms, X
represents a halogen atom such as chlorine or bromine,
and R represents an alkyl group of 1 to 4 carbon atoms
or a phenyl group, e.g. methyl, ethyl, propyl, isopropyl,
butyl, phenyl, etc. The above defined quaternary salt
polymers are film-forming and have numerous uses, but
are particularly valuable as antistatic coatings on sheet
materials such as on light-sensitive photographic films to
prevent static markings produced by friction in the manu-
facture, use and processing of the same. Each of the
species coming within the above structures have their
own particular characteristics as to their antistatic effi-
cacy. Thus, a particular species may be preferred for
one type of photographic application whereas for a differ-
ent photographic application another species may be
more adapted.

It is, accordingly, an object of this invention to provide
a new class of polymeric compounds. A more specific
object is to provide new polymeric salts. Another object
is to provide sheet materials that are antistatic in char-
acter, and more particularly photographic films that are
static resistant. Another object is to provide processes
for preparing such polymeric salts and coated materials
prepared therewith. Other objectives will become appar-
ent hereinafter.

In accordance with the invention, we prepare the poly-
meric salts of the invention above defined by reacting cer-
tain poly-C-vinylpyridinium haloketones with Girard re-
agents "T" and "P" (betaine hydrazide hydrochloride and
carbohydrazinomethylpyridinium chloride, respectively),
in a reaction medium of methanol, by gentle heating and
stirring in a hot water bath until the reaction is substan-
tially completed. The resulting product is soluble in the
reaction mixture but may be precipitated into a non-sol-
vent such as diethyl ether, filtered, washed with fresh ether
and dried. The intermediate poly-C-vinylpyridinium halo-
ketones may be prepared as described and claimed in our
copending application Serial No. 681,601, filed of even
date herewith. The Girard reagents may be prepared ac-
cording to direction in "Organic Synthesis," Collective
vol. 2, page 85 (1943), and according to Sandulesco,
Helv. Chim. Acta. 19, page 1095 (1936).

It is also within the invention to employ certain co-
polymers of vinylpyridines such as those prepared by
copolymerizing the C-vinylpyridine with a lesser quantity
of polymerizable monomers such as styrene, acrylic acid
esters and amides, and α-alkyl substituted acrylic acid
esters and amides. However, the quarternary salts of the
invention prepared with the homopolymers of C-vinyl-
pyridine are preferred.

The intermediate vinylpyridine polymers of the inven-
tion may be prepared by conventional polymerization
methods wherein the 2-vinylpyridine, 3-vinylpyridine, 4-
vinylpyridine, 2-methyl-5-vinylpyridine, etc. monomers
are heated in the presence of a polymerization catalyst
such as benzoyl peroxide, ammonium persulfate, potas-
sium persulfate, etc., in mass, in solution in an inert or-
ganic solvent or by polymerizing in emulsion form in a
non-solvent such as water, the resulting polymers being
separated from the polymerization reaction mixtures by
conventional means such as precipitating, filtering, wash-
ing and drying.

The accompanying drawing is a sectional view of a
photographic film base 1 composed of a hydrophobic
material such as a cellulose derivative, e.g. cellulose ace-
tate, cellulose propionate, cellulose acetate-butyrate, cellu-
lose nitrate, etc. polyamides such as nylon, a polyester
such as polyethylene terephthalate and the like, has coated
thereon a polymeric salt of the invention as layer 2, and
on the opposite side a layer 3 of a light-sensitive material,
e.g., a gelatine-silver halide emulsion. The layer 2 of the
polymeric salt may also have therein a substantial propor-
tion of gelatine if desired. Although the preferred method
of employing the polymeric salts of the invention is in
the form of a backing layer as shown in the drawing, the
polymeric salts can also be used in the sensitive emulsion
layer or used as an overcoating layer over the sensitive
emulsion layer to give antistatic properties to the photo-
graphic film. However, as indicated in the drawing, application of the polymeric salts to the back of the film, i.e., to the side opposite that of the sensitive emulsion layer, is preferred.

The following examples will serve to illustrate further the preparation of the polymeric salts of the invention and the application of the same to the product of light-sensitive films having excellent antistatic properties.

EXAMPLE 1

A. 323 g. (3.07 moles) of poly-4-vinylpyridine having a viscosity [{n}=1.22] were dissolved in 2 liters of methyl alcohol by stirring at room temperature. Then 420 g. (4.5 moles) of freshly distilled chloroacetone were added to the viscous solution and the mixture was heated in a water bath at reflux temperature for 24 hours, after which time a dope was obtained which was completely water soluble. After dilution with 1 liter of methyl alcohol, the resulting quaternary salt polymer was precipitated from solution in several volumes of diethyl ether. The precipitated product was leached in two changes of ether and dried over $P_2O_5$ at reduced pressure. It was a brittle, light-buff solid. Analysis of this product showed that it contained by weight 57.8 percent of carbon, 6.2 percent of hydrogen, 7.5 percent of nitrogen and 16.8 percent of chlorine, compared with calculated theory for $C_{10}H_{12}NOCl$ of 60.7 percent, 6.0 percent, 7.1 percent and 17.9 percent respectively. Accordingly, the product was approximately 100 percent poly-4-vinylpyridinium chloroacetone represented by the following recurring structural unit:

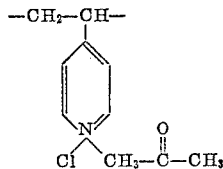

B. 100 g. (0.50 mole) of poly-4-vinylpyridinium chloroacetone prepared as in above A were dissolved in 1700 cc. of methanol by gentle heating and stirring in a hot water bath. Then 88 g. (0.501 mole) of carbohydrazinomethylpyridinium chloride (Girard reagent "P") were added and warming continued for 2 hours. After this time, the resulting dope which was water-soluble was precipitated into 10 liters of diethyl ether. The resulting buff-colored product was leached in fresh ether, filtered and dried. Analysis of this product showed that it contained by weight 51.4 percent of carbon, 5.6 percent of hydrogen, 13.2 percent of nitrogen, and 17.8 percent of chlorine compared with calculated theory for $C_{17}H_{20}N_4OCl_2$ of 55.7 percent, 5.4 percent, 15.2 percent, and 19.1 percent respectively. Accordingly, the resulting product contained approximately 93 percent of the following recurring structural units:

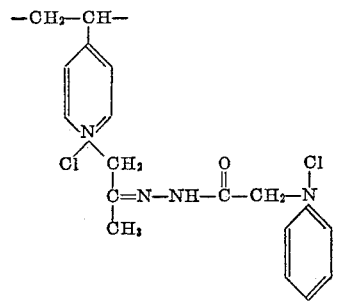

the remainder of the molecule being residual unreacted 4-vinyl-pyridinium chloroacetone units.

EXAMPLE 2

A. 100 g. (0.95 mole) of poly-4-vinylpyridine and 160 g. (1.03 moles) of α-chloroacetophenone were reacted in 1750 cc. of methanol and the product isolated and purified according to the method set forth in above Example 1A. The product was a buff-colored solid which on analysis was shown to contain by weight 65.7 percent of carbon, 5.7 percent of hydrogen, 5.9 percent of nitrogen and 12.9 percent of chlorine compared with calculated theory for $C_{15}H_{14}NOCl$ of 69.5 percent, 5.4 percent, 5.4 percent and 13.7 percent respectively. Accordingly the product obtained in 94 percent yield was essentially poly-4-vinylpyridinium-α-chloroacetophenone.

B. 50 g. (0.19 mole) of poly-4-vinylpyridinium-α-chloroacetophenone prepared as in above A were reacted with 33 g. (0.19 mole) of carbohydrazinomethylpyridinium chloride (Girard reagent "P") in 750 cc. of methanol and the product isolated and purified in the same manner as set forth in above Example 1B. This product was obtained in an amount of 75 g. or 87.6 percent of the theoretical value of 85.6 g. Analysis showed that it contained by weight 55.7 percent of carbon, 5.6 percent of hydrogen, 12.5 percent of nitrogen, and 15.1 percent of chlorine compared with calculated theory for $C_{22}H_{21}N_4OCl_2$ of 60.7 percent of carbon, 4.9 percent of hydrogen, 13.1 percent of nitrogen and 16.6 percent of chlorine respectively. Accordingly, the product contained approximately 90 percent by weight of the following recurring structural units:

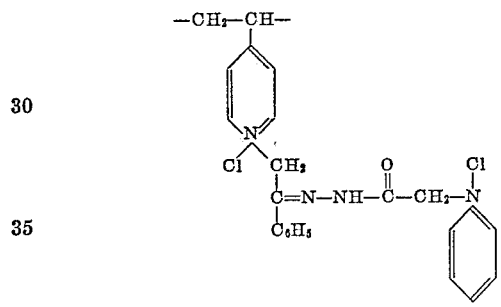

the remainder of the molecule being recurring unreacted 4-vinylpyridinium-α-chloroacetone units.

In place of the carbohydrazinomethylpyridinium chloride in above Example 1B and Example 2B, there may be substituted in each instance an equivalent amount of betaine hydrazide hydrochloride (Girard reagent "T") to give polymeric salts that comprise essentially the recurring structural units for the process of Example 1B as follows:

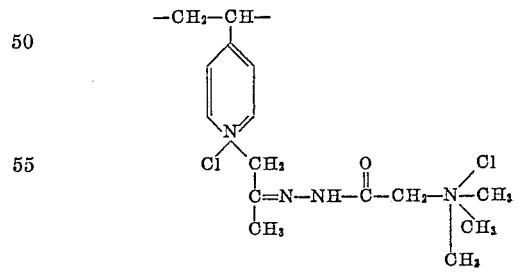

and for the process of 2B as follows:

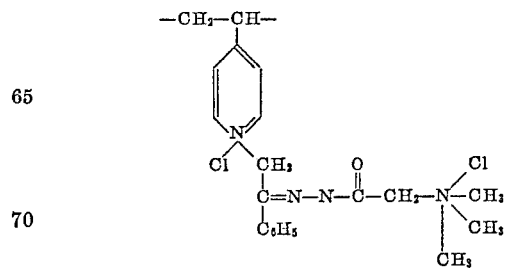

EXAMPLE 3

This example illustrates the antistatic properties of photographic films coated with the polymeric salts of the invention.

In each instance, the polymeric salt was dissolved in a mixture of acetone-water or a mixture of acetone-methanol in a concentration varying from about 0.125–2.000 percent by weight of the polymeric salt, and the solution was then applied as a backing to a sheet of cellulose acetate film base by means of a dip roller and dried. The film was then further coated on the reverse side with a suitable subbing layer and a gelatino-silver halide emulsion. The following table lists the polymeric salt, the solvent combination, the concentration of polymeric salt therein, the coverage of the coating, and the conductivity and appearance of the coated films.

polymer consisting of from 70 to approximately 100% by weight in linear combination of a recurring structural unit selected from the group consisting of a recurring unit of the general structure:

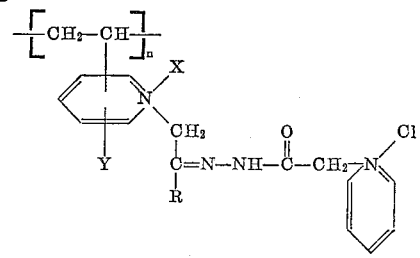

Table

| Polymeric Salt | Antistatic Coating Composition ||| Coated Film |||
|---|---|---|---|---|---|---|
| | Solvent Combination—Wt. Ratios ||| Concentration, Polymeric Salt, Wt. Percent | Antistatic Coating || Appearance |
| | Acetone | Methanol | Water | | Coverage, micrograms/cm.² | Conductivity ×10⁻¹⁰ mho | |
| Product of Example 1B | 35 | | 65 | 0.125 | 2.0 | 19 | clear. |
| Do | 35 | | 65 | 0.500 | 6.6 | 30 | Do. |
| Do | 35 | | 65 | 2.000 | | 260 | hazy. |
| Do | 70 | 30 | | 0.125 | 3.5 | 15 | clear. |
| Do | 70 | 30 | | 0.500 | 11.6 | 100 | Do. |
| Do | 70 | 30 | | 2.000 | 62.0 | 280 | Do. |
| Do | 80 | 20 | | 0.125 | 2.2 | 0.5 | Do. |
| Do | 80 | 20 | | 0.500 | 0.8 | 11 | Do. |
| Do | 80 | 20 | | 2.000 | 2.2 | 40 | Do. |
| Product of Example 2B | 80 | 20 | | 0.250 | | 1.7 | |
| Do | 80 | 20 | | 0.500 | | 4.5 | |
| Do | 80 | 20 | | 1.000 | | 23.8 | |
| Do | 70 | 30 | | 0.500 | | 0.4 | |
| Do | 70 | 30 | | 1.000 | | 2.1 | |
| Do | 70 | 30 | | 2.000 | | 91.0 | |

Since conductivities of the order greater than $10^{-10}$ mhos have been found to alleviate difficulties from static electricity generated in the normal handling of photographic film, it will be seen from the above table that by use of the polymeric salts of the invention in appropriate concentrations and solvent combinations as coatings, films can be prepared which are free from troublesome static effects.

The conductivity measurements for the above table were carried out by placing two parallel electrodes on the film at a fixed relative humidity of 50 percent; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. Also, various fillers, dyes softeners, etc. can be incorporated, if desired, into the coating compositions of the invention. In addition to these uses, the polymeric salts and coating compositions of the invention are also useful for rendering paper, textile materials, etc. antistatic by treatment therewith and are capable of functioning in many processes as wetting agents. In general, the solubility of the polymeric salts of the invention vary in solubility depending upon the proportion of quaternary salt units contained therein, for example, they are methanol-soluble, water-insoluble at somewhat less than 70% by weight of quaternized units but methanol-soluble, water-soluble for the salts containing 70 to approximately 100% by weight of quaternized units.

What we claim is:
1. A quaternary salt of a resinous C-vinylpyridine polymer consisting of from 70 to approximately 100% by weight in linear combination of a recurring structural unit selected from the group consisting of a recurring unit of the general structure:

and a recurring unit of the general structure:

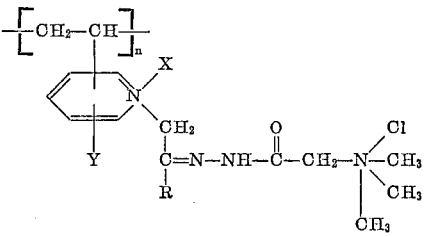

the remainder of the polymer molecule being C-vinylpyridinium haloketone units represented by the following general structure:

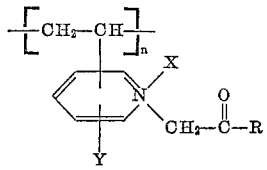

wherein $n$ represents a positive whole number, Y represents a member selected from the group consisting of a hydrogen atom and an alkyl group of 1 to 4 carbon atoms, X represents a member selected from the group consisting of a chlorine atom and a bromine atom and R represents a member selected from the group consisting of an alkyl group of 1 to 4 carbon atoms and a phenyl group.

2. A quaternary salt of a resinous C-vinylpyridine polymer consisting of from 70 to approximately 100% by weight in linear combination of recurring units of the structure:

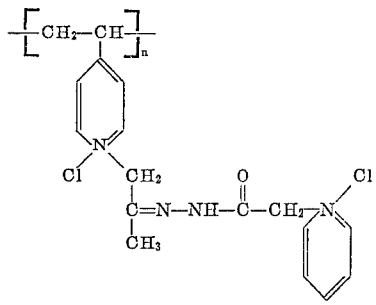

wherein *n* represents a positive whole number, the remainder of the polymer molecule being residual 4-vinylpyridinium chloroacetone units.

3. A quaternary salt of a resinous C-vinylpyridine polymer consisting of from 70 to approximately 100% by weight in linear combination of recurring units of the structure:

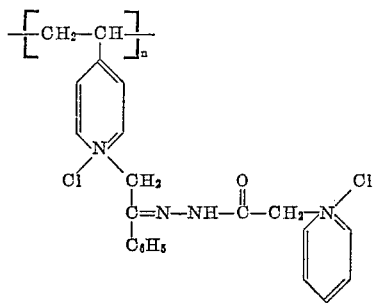

wherein *n* represents a positive whole number, the remainder of the polymer molecule being residual 4-vinylpyridinium-α-chloroacetophenone units.

4. A quaternary salt of a resinous C-vinylpyridine polymer consisting of from 70 to approximately 100% by weight in linear combination of recurring units of the structure:

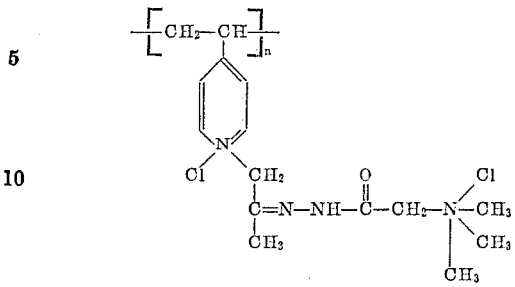

wherein *n* represents a positive whole number, the remainder of the polymer molecule being residual 4-vinylpyridinium chloroacetone units.

5. A quaternary salt of a resinous C-vinylpyridine polymer consisting of from 70 to approximately 100% by weight in linear combination of recurring units of the structure:

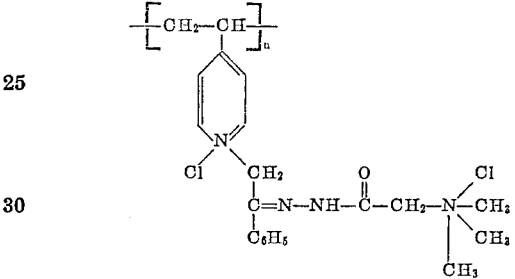

wherein *n* represents a positive whole number, the remainder of the polymer molecule being residual 4-vinylpyridinium-α-chloroacetophenone units.

References Cited in the file of this patent

UNITED STATES PATENTS 2,843,573   Melamed _____ Mar. 21, 1955